United States Patent
Kim et al.

(10) Patent No.: US 6,400,394 B1
(45) Date of Patent: Jun. 4, 2002

(54) 3-DIMENSIONAL IMAGE PROJECTION DISPLAY SYSTEM AND METHOD

(75) Inventors: Sung-Sik Kim; Seong-Eun Chung, both of Seoul (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/187,921

(22) Filed: Nov. 6, 1998

(30) Foreign Application Priority Data

Nov. 6, 1997 (KR) .............................................. 97-58354

(51) Int. Cl.⁷ .......................... H04N 13/04; H04N 15/00
(52) U.S. Cl. ........................................... 348/51; 348/42
(58) Field of Search ........................ 348/42–44, 49–51, 348/53–55, 57–60; 359/483, 490, 462–466; 382/154

(56) References Cited

U.S. PATENT DOCUMENTS

| | | | |
|---|---|---|---|
| 3,670,097 A | 6/1972 | Jones | 348/49 |
| 4,027,947 A | 6/1977 | Taylor | 359/478 |
| 4,217,602 A | 8/1980 | Thomas et al. | 348/60 |
| 4,871,231 A | 10/1989 | Garcia, Jr. | 348/51 |
| 5,082,350 A | 1/1992 | Garcia et al. | 348/51 |
| 5,086,354 A | 2/1992 | Bass et al. | 359/465 |
| 5,144,482 A | 9/1992 | Gould | 359/478 |
| 5,488,952 A | 2/1996 | Schoolman | 600/443 |
| 5,995,759 A | * 11/1999 | Kohayakawa | 396/18 |
| 6,011,580 A | * 1/2000 | Hattori et al. | 348/57 |

FOREIGN PATENT DOCUMENTS

JP 9-146041 * 9/1997 .......... H04N/13/04

* cited by examiner

*Primary Examiner*—Vu Le
(74) *Attorney, Agent, or Firm*—Robert E. Bushnell, Esq.

(57) ABSTRACT

A 3D image projection display system for displaying a 3D image on a screen includes a projector for projecting the left eye image of the 3D image polarized in a first polarizing direction and the right eye image polarized in a second polarizing direction perpendicular to the first direction, the pixels of the left eye image being arranged alternately with those pixels of the right eye image in a matrix form, and a plurality of reflectors for magnifying and reflecting the image projected for the left eye image and for the right eye image from the projector, wherein the image light reflected from the last one of the plurality of reflectors is projected on the screen.

16 Claims, 5 Drawing Sheets

3-DIMENSIONAL IMAGE PROJECTION DISPLAY SYSTEM AND METHOD

CROSS-REFERENCE TO RELATED APPLICATION

This application make reference to, incorporates the same herein, and claims all benefits accruing under 35 U.S.C. §119 through my patent application 3-DIMENSIONAL IMAGE PROJECTION DISPLAY SYSTEM earlier filed on the 6$^{th}$ day of November 1997 in the Korean Industrial Property Office, and there regularly assigned Serial No. 58354/1997.

BACKGROUND OF THE INVENTION

1. Field of the Invention

The present invention relates to a display system, and more particularly to a stereoscopic image display system for displaying a three dimensional image (3D image).

2. Discussion of Related Art

The 3D video camera is to record a 3D image which gives the effect of solidity or depth to an ordinary plane image. The 3D image is usually produced by employing the visual effect obtained by a stereoscope, through which one can view photographs of objects not merely as plane representations, but with an appearance of solidity, and in relief. The stereoscope is essentially an instrument in which two photographs of the same object, taken from slightly different angles, are simultaneously presented, one to each eye. Each picture is focused by a separate lens, and the two lenses are inclined so as to shift the images toward each other and thus ensure the visual blending of the two images into one three dimensional image. The 3D images taken by the video camera are usually processed to display according to NTSC (National Television System Committee) or PAL (Phase Alteration by Line).

The 3D image obtained by blending the two images consisting of a right and left eye images is processed through a suitable 3D display system, displayed on a screen. The viewer must put on stereoscopic glasses in order to view the 3D image. Typically, the 3D display system exemplary of contemporary practice in the art is designed to display the 3D image on a small screen that is not suitable for many viewers.

U.S. Pat. No. 3,670,097 entitled Stereoscopic Television System and Apparatus to Jones discloses a stereoscopic remote viewing system including a remote camera unit having means for projecting a pair of binocular images of a remote object through a common lens system onto the sensitive face of a single television camera tube for transmission to a viewing unit having a television picture which can be viewed through a binocular image separation system that enables the viewer to see a stereoscopic image of the remote object. Means are disclosed as being provided in the remote camera unit for inverting one of the two images and then causing the two images to be projected mirror symmetrically onto the camera tube through the common lens system.

U.S. Pat. No. 4,027,947 entitled Optical Device for Providing a Three Dimensional View of a Two Dimensional Image to Taylor discloses an optical device for providing a three dimensional view of a two dimensional image therein having a holder for pivotally supporting coacting right and left viewing conduits, each respectively in communication at one end with the two dimensional image and at the opposite ends the right viewing conduit having a right eye viewing member and the left viewing conduit having a left eye viewing member, with the right and left viewing conduit having therein coacting optical systems which act to split the two dimensional image and to pass one split image from the right conduit to the left eye viewing member on the left viewing conduit, and the other split image from the left viewing conduit to the right eye viewing member so that when the images are viewed binocularly they will give a three dimensional optical effect.

U.S. Pat. No. 4,217,602 entitled Method and Apparatus for Generating and Processing Television Signals for Viewing in Three Dimensions to Thomas disclose an apparatus for generating and processing television signals of a visual scene for viewing in three dimensions, including a conventional TV camera including three separate color video camera tubes, each camera tube adapted to receive light of a different one of three primary colors. Each camera tube is disclosed as being aligned with one of three optical axes which are nominally parallel, and are spaced apart a selected distance in a horizontal plane. It is disclosed that at least one of the first and third axes is rotatable so that it can be turned through a small angle in such a direction as to intersect the second and third axes at selected distances in front of the camera. Synchronizing beams are disclosed as being provided for two sub-rasters in scanning of the camera tubes. It is disclosed when the transmitter signal is received and displayed on a TV receiver and is viewed through a pair of eye glasses, in which one glass passes the first primary color and the other glass passes the third primary color, the visual scene will be seen in three dimensional viewing.

U.S. Pat. No. 4,871,231 entitled Three Dimensional Color Display and System to Garcia, Jr. discloses a three dimensional color display wherein controlled modulated laser light of predetermined different frequencies is transmitted via fiber optics and combined in a fiber optic coupler to provide a combined light beam. It is disclosed that the light beam is transmitted along a fiber optic path wherefrom it is collimated and a three dimensional color display is formed therefrom, with the three dimensional display being provided by an X-Y scanner for forming a two dimensional image from the light on the single fiber optic path, a rotating display screen for causing each point on the two dimensional image to move along a path making an acute angle with the two dimensional image, wherein operation of one of the scanner and the rotating display screen is controlled relative to the other.

U.S. Pat. No. 5,082,350 Entitled Real Time Three Dimensional Display System for Displaying Images in Three Dimensions which Are Projected onto a Screen in Two Dimensions, to Garcia, et al. disclose a three dimensional display system wherein a scanned light beam is displayed upon a continuously rotating display member rotating about a fixed axis. One embodiment provides that the display member includes a pair of intersecting display surfaces. In another embodiment the display member is formed by a bundle of fiber optic elements extending from an image projector to a viewing surface. In a further embodiment it is disclosed the angle formed between the display member and the axis about which it rotates is adjusted, on or off line, by changing the length of an adjustable rod secured to the display member and a member rotating with the display member. In another embodiment, it is disclosed the light is transmitted to the rotating disc through a pair of changeable rotating apertured disks wherein the apertures are aligned.

U.S. Pat. No. 5,086,354 Entitled Three Dimensional Optical Viewing System to Bass, et al. disclose an optical viewing system for producing a simulated, three dimensional image utilizing two video monitors and a half silvered mirror, wherein the two dimensional image produced by one monitor is transmitted through the half silvered mirror while the second image from the second monitor is reflected from the half silvered mirror and overlaid onto the image of the first monitor.

U.S. Pat. No. 5,144,482 Entitled Three Dimensional Viewing Apparatus Including a Stack of Transparent Plates and Related Method to Gould, discloses a method and apparatus for viewing two dimensional images with a three dimensional effect utilizing a stack of closely spaced, thin plates, producing a multiple interferometer effect via inter and intra plate reflections between the plates.

U.S. Pat. No. 5,488,952 entitled Stereoscopically Display Three Dimensional Ultrasound Imaging to Schoolman discloses a stereoscopically displayed three dimensional ultrasound imaging system which derives image data from an ultrasound imaging apparatus including a two dimensional ultrasound transducer array, reconstructs the image data into a three dimensional model, and displays right and left stereoscopic three dimensional image components of the model on corresponding right and left video display devices of a stereoscopic viewing unit. It is disclosed the system includes a system computer interfaced to the imaging apparatus and a pair of image channels, each including a three dimensional display processor and a video display device. The three dimensional display processors are disclosed as receiving polygon image data, reconstructing it into a three dimensional form, and selecting the image data representing a three dimensional view from a selected perspective. It is disclosed the system computer controls the display processors to present mutually angularly displaced views of the same three dimensional image to form the stereoscopic image components.

SUMMARY OF THE INVENTION

It is an object of the present invention to provide a stereoscopic image display system with means to display the 3D image on a sufficiently large screen to satisfy many viewers.

According to the present invention, a 3D image projection display system for displaying a 3D image on a screen, comprises a projector for projecting the left eye image of the 3D image polarized in a first polarizing direction and the right eye image polarized in a second polarizing direction perpendicular to the first direction, the pixels of the left eye image being arranged alternately with those pixels of the right eye image in a matrix form, and a plurality of reflectors for magnifying and reflecting the image projected for the left eye image and for the right eye image from the projector, wherein the image light reflected from the last one of the plurality of reflectors is projected on the screen.

Preferably, the projector further comprises a 3D video signal processor for multiplexing the video data of the left eye and right eye image pixels of the 3D image signal to be alternately arranged in a matrix, an LCD panel for displaying a multiplexed 3D video image from the 3D video signal processor, and a projection system for projecting the left eye and right eye images of the 3D video image displayed on the LCD panel in the two polarizing directions.

Preferably, the projection system further comprises a light source for generating a visible light, a reflector for reflecting the visible light in a given direction, a first lens for focusing reflected visible light from the reflector, a first dichroic mirror for separating the visible light into red (R), green (G) and blue (B) rays, a filter for making the separated R, G, B rays uniform, a first polarizing plate and a second polarizing plate arranged at both sides of the LCD panel to make use of the anisotropic light characteristics of the LCD panel, a second dichroic mirror for mixing the R, G, B rays received from the filter through the first polarizing plate, LCD panel and second polarizing panel, a micro polarizer including of a plurality of unit polarizing regions corresponding to the pixels of the LCD panel to polarize the mixed light produced from the second dichroic mirror into the left eye and right eye images, the adjacent ones of the unit polarizing regions being polarized in the two different polarizing directions, and a second lens for magnifying the left eye and right eye images from the micro polarizer. Preferably, the 3D video signal processor further includes a signal separator for separating the 3D image signal into a synchronizing signal and a video signal, an analog to digital converter (A/D converter) for converting the video signal into a digital video signal, a first field memory and a second field memory for respectively storing the left eye and right eye video data of the odd numbered frame of digital video data from the A/D converter, a third field memory and a fourth field memory for respectively storing the left eye and right eye video data of the even numbered frame of digital video data from the A/D converter, a first multiplexer for multiplexing the left eye and right eye video data of the first and second field memories to be alternately arranged in a matrix to form a single frame, a second multiplexer for multiplexing the left and right eye video data of the third and fourth field memories to be alternately arranged in a matrix, a digital switch for alternately transferring the outputs of the first and second multiplexers, and a controller for performing the overall control function according to the synchronizing signal. The 3D video signal processor can further include a digital to analog converter (D/A converter) for converting a digital video signal transferred by the digital switch into an analog video signal.

BRIEF DESCRIPTION OF THE ATTACHED DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

The inventive 3D image projection display system separates a 3D video signal into a right eye image signal and a left eye image signal, which is then multiplexed, and transferred to an LCD panel. The 3D image displayed on the LCD panel is polarized through a micro polarizer, reflected on a plurality of reflectors and projected on a screen. The viewer puts on a pair of polarizing glasses having micro polarizers arranged in the horizontal and vertical polarizing directions in order to view the 3D image projected on the screen.

Figure 1:
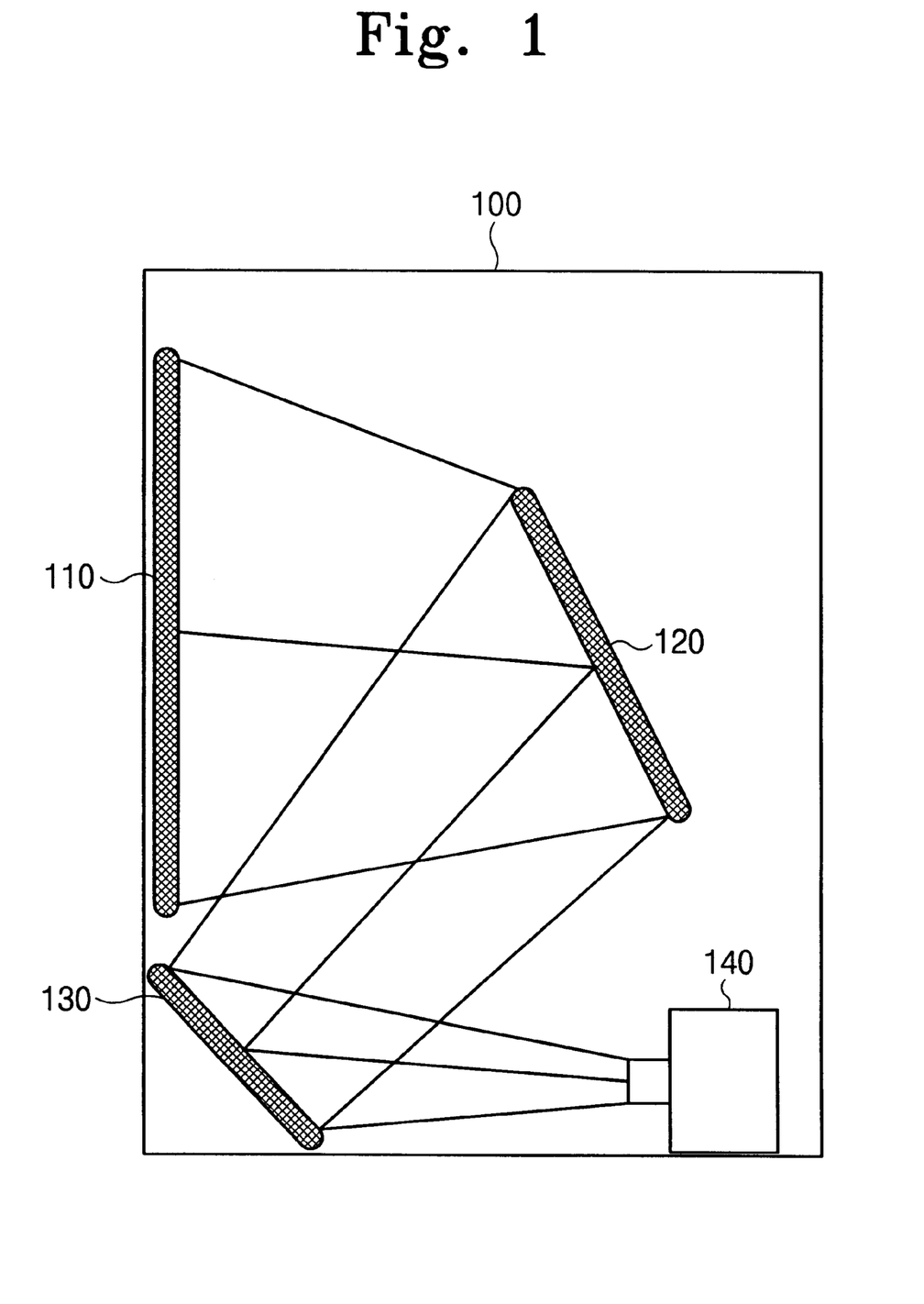
FIG. 1 is a schematic diagram for illustrating the structure of a 3D image projection display system according to an embodiment of the present invention.

Referring to FIG. 1, the 3D image projection display system 100 includes a screen 110, first reflector 130 and second reflector 120, and a projector 140, which also includes a 3D video signal processor and a projection system for projecting the 3D image as visible light. The 3D image light projected from the projector 140 is sequentially reflected by the first reflector 130 and the second reflector 120, and finally projected on the screen 110. The viewer puts on a pair of polarizing glasses provided with micro polarizers arranged in the two perpendicular directions, the horizontal and vertical polarizing directions, to view the 3D image. The first and second reflectors 130 and 120 can be arranged at proper or appropriate angles with respect to the projector 140. The number and sizes of the reflectors can be determined according to the size of the screen 110. Thus, the 3D image projected from the projector 140 can be magnified by several tens of times, for example, over a 40 inch screen.

Figure 2:
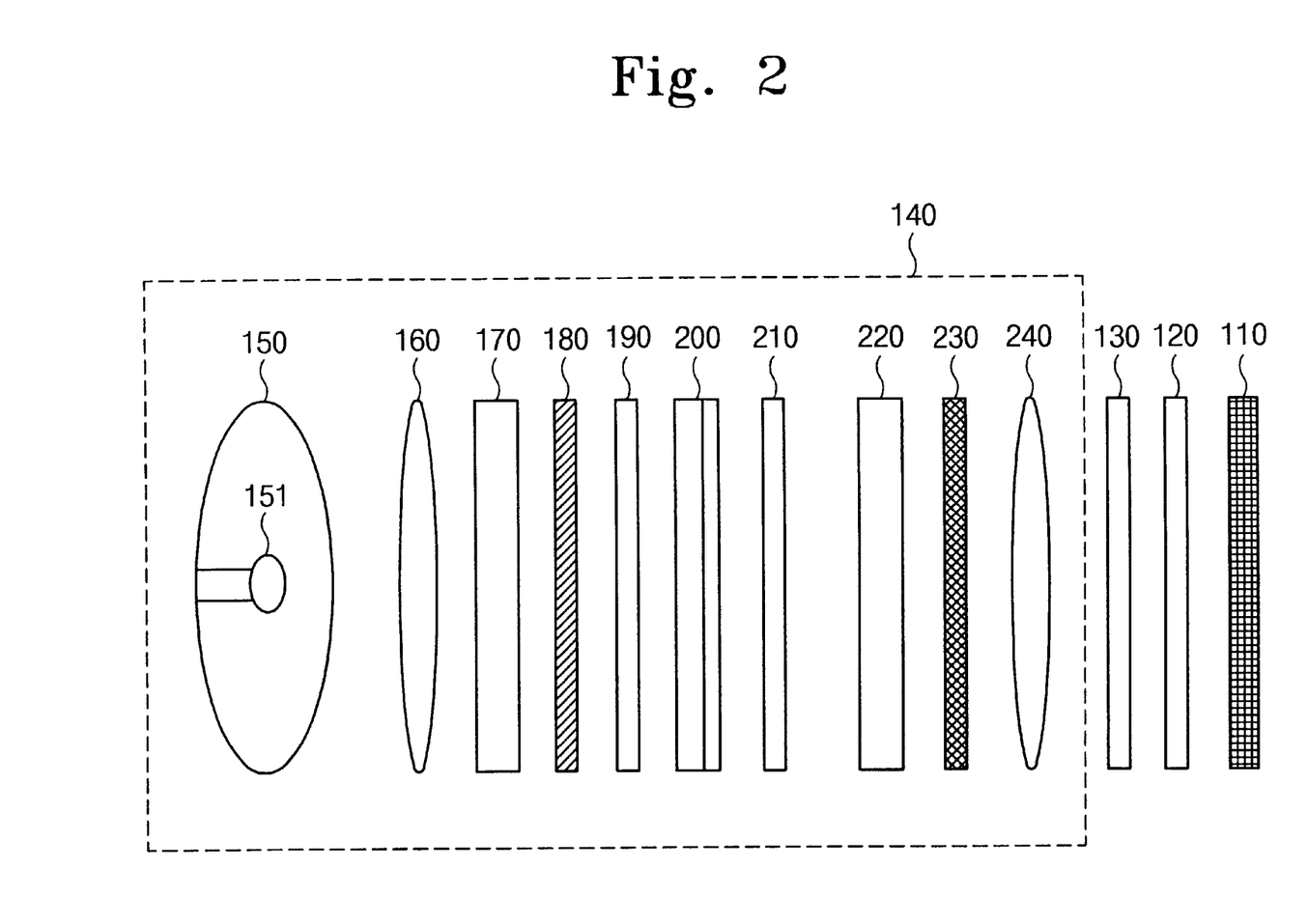
FIG. 2 is a diagram for illustrating the structure of the projection system of FIG. 1.

Describing the projection system and 3D video signal processor provided in the projector 140 referring to FIG. 2, the visible light produced from a light source 151 is reflected on a reflector 150, focused by a lens 160. The visible light transmitted through the lens 160 is separated by a dichroic mirror 170 into R, G and B rays made uniform through a filter 180. The light rays are transferred through a first polarizing plate 190, a liquid crystal display (LCD) panel 200 and a second polarizing plate 210. Passing through the LCD panel 200, the light rays form a 3D image, which is color-mixed through a dichroic mirror 220, then polarized by a micro polarizer 230 into the left eye and right eye images projected through a lens 240 on the first reflector 130. Namely, the image light generated from the projector 140 includes the left eye and right eye image light rays polarized in the two perpendicular polarizing directions namely, the horizontal and vertical polarizing directions, for example.

Figure 3:
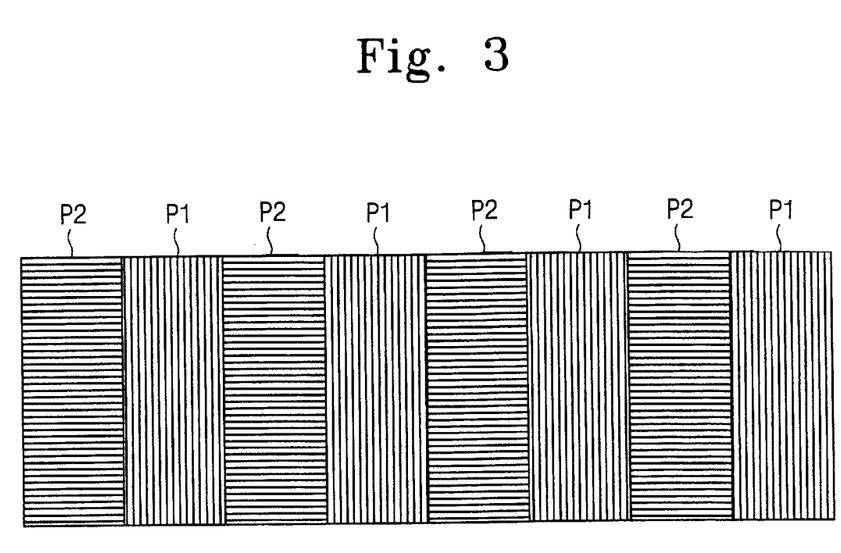
FIG. 3 is a diagram for illustrating a part of a row of the unit polarizing regions constituting the micro polarizer as shown in FIG. 2.

As shown in FIG. 3, the micro polarizer 230 includes unit horizontal polarizing regions P2 polarized in the horizontal direction and unit vertical polarizing regions P1 polarized in the vertical direction. The unit horizontal polarizing regions P2 and the unit vertical polarizing regions P1 are alternately arranged in a matrix corresponding to the pixels of the LCD panel 200.

Figure 4:
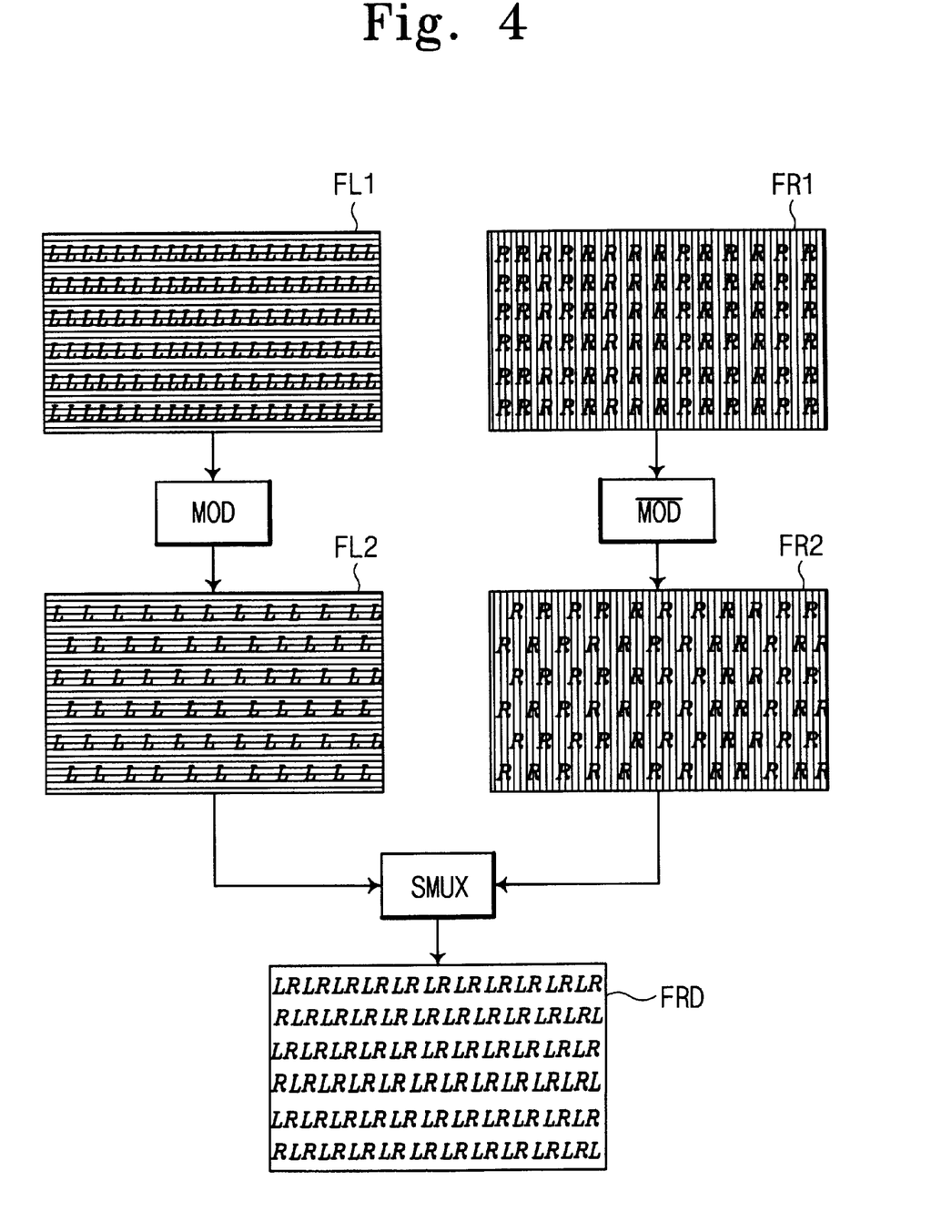
FIG. 4 is a diagram for illustrating the combining of the left eye and right eye images into a 3D image according to the present invention.

The 3D or spatially multiplexed image (SMI) is obtained by combining the left eye and right eye image frame data FL1 and FR1, as shown in FIG. 4. The left eye frame data FL1 is modified by a modulator MOD so that the pixels are alternately selected to produce a modified left eye frame data FL2. Likewise, the right eye frame data FR1 is modified by a complementary modulator $\overline{\text{MOD}}$ so that the pixels are alternately selected to produce a modified right eye frame data FR2 complementary to the modified left eye frame data FL2. These two complementary frame data FL2 and FR2 are multiplexed by a multiplexer SMUX to produce a final image data frame FRD, with pixels of the left eye image being arranged alternately in a same line with pixels of the right eye image in a matrix form as illustrated in the final image data frame FRD in FIG. 4. Thus, putting on the polarizing glasses, the viewers can view the 3D image of the final image data frame FRD displayed on the screen 110. In this case, the left lens of the polarizing glasses is provided with a micro polarizer polarized in the horizontal direction to pass the left eye image light, and the right lens is provided with a micro polarizer polarized in the vertical direction to pass the right eye image light.

Figure 5:
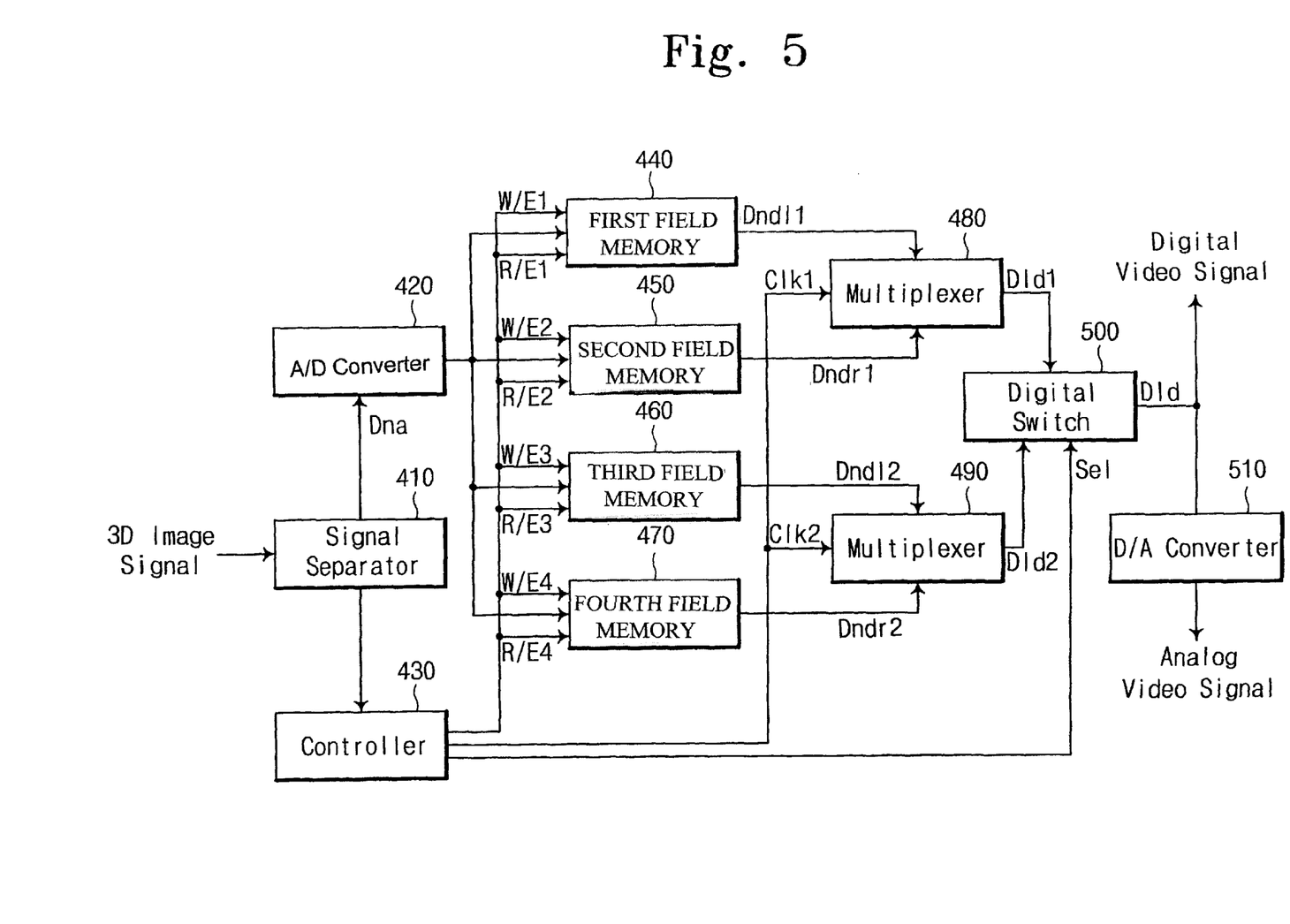
FIG. 5 is a block diagram for illustrating a 3D video signal processor according to the present invention.

Referring to FIG. 5, the 3D video signal processor includes a signal separator 410, an A/D converter 420, a controller 430, first to fourth field memories 440, 450, 460 and 470, respectively, and first and second multiplexers 480 and 490, respectively, a digital switch 500, and a D/A converter 510. The signal separator 410 separates the received 3D image signal into a synchronizing signal and a RGB video signal with an interlaced or a non-interlaced function. For example, a 3D image signal in NTSC or from a computer system is separated by the signal separator 410 into a synchronizing signal applied to the controller 430 and a RGB video signal Dna applied to the A/D converter 420, which converts the RGB signal into a digital signal-applied to the first to fourth field memories 440 to 470. The first field memory 440 stores the odd numbered frame data of the left eye image, the second field memory 450 stores the odd numbered frame data of the right eye image, the third field memory 460 stores the even numbered frame data of the left eye image, and the fourth field memory 470 stores the even numbered frame data of the right eye image.

The required capacity of the field memories is 1,843,200= (640×480)×3(R,G,B)×2(Right, Left), in case of VGA. In this case, the frequency to write or read the field memories should be at least 18.4 MHz because 640×480 data must be processed in 1/60 seconds, i.e., 640×480×60=18.4 Mega. Table 1 shows the capacities and minimum frequencies of the field memories according to different video modes.

TABLE 1

| Video Mode | Memory Capacity | Minimum Clock Frequency |
|---|---|---|
| VGA | 1843200 = 640*480*3*2 | 18.4 MHz = 640*480*60 |
| SVGA | 2880000 = 800*600*3*2 | 28.8 MHz = 800*600*60 |
| XGA | 4718592 = 1024*768*3*2 | 47.2 MHz = 1024*768*60 |

The first to fourth field memories 440 to 470 respectively store corresponding frame data generated from the A/D converter 420 according to the write enable signals W/E1 to W/E4 received from the controller 430, and respectively transfer the corresponding frame data to the first and second multiplexers 480 and 490 according to the read enable signals R/E1 to R/E4 received from the controller 430. The first and second multiplexers 480 and 490 multiplex the frame data of the left eye image and the right eye image retrieved from the first to fourth field memories 440 to 470 according to the switching clock signals Clk1, Clk2 from the controller 430, so as to produce the digital signals D1d1, D1d2 subjected to polarity inversion according to the characteristics of the LCD panel 200, as described in connection with FIG. 4. The digital switch 500 selectively transfers the digital signal D1d1 or the digital signal D1d2 respectively generated from the first or second multiplexer 480 or 490 to the LCD panel 200 according to a selection signal Se1 from the controller 430. The D/A converter 510 converts the digital signal D1d passing through the digital switch 500 into an analog signal applied to an analog display system.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the scope thereof. Therefore, it is intended that the present invention not be limited to the particular embodiments disclosed as the best mode contemplated for carrying our the present invention, but that the present invention includes all embodiments falling within the scope of the appended claims.

What is claimed is:

1. A three dimensional image projection display system for displaying a three dimensional image on a screen, comprising:
   a projector for projecting a left eye image of a three dimensional image polarized in a first polarizing direction and a right eye image of said three dimensional image polarized in a second polarizing direction perpendicular to the first polarizing direction, with pixels of said left eye image being arranged alternately in a same line with pixels of said right eye image in a matrix form; and
   at least one reflector for magnifying and reflecting an image projected including said right eye image and said left eye image from said projector, with image light reflected from said at least one reflector for projection on a screen.

2. The three dimensional image projection display system of claim 1, further comprised of said projector comprising:
   a three dimensional video signal processor for multiplexing video data of the pixels of said left eye image and video data of the pixels of said right eye image of a three dimensional image signal so as to alternately arrange in a same line said video data of the pixels of said left eye image and said video data of the pixels of said right eye image in a matrix form;
   a liquid crystal display panel for displaying a multiplexed three dimensional video image from said three dimensional video signal processor; and
   a projection system for projecting said left eye image and said right eye image of said three dimensional video image displayed on said liquid crystal display panel respectively in the first polarizing direction and in the second polarizing direction.

3. The three dimensional image projection display system of claim 2, further comprised of said three dimensional video signal processor including an analog to digital converter for converting an analog video signal into a digital video signal and including a digital to analog converter for converting a digital video signal into an analog video signal.

4. A three dimensional image projection display system for displaying a three dimensional image on a screen, comprising:
   a three dimensional video signal processor for multiplexing video data of pixels of a left eye image and video data of pixels of a right eye image of a three dimensional image signal so as to alternately arrange said video data of the pixels of said left eye image and said video data of the pixels of said right eye image in a matrix form;
   a liquid crystal display panel for displaying a multiplexed three dimensional video image from said three dimensional video signal processor; and
   a projection system for projecting said left eye image and said right eye image of said, multiplexed three dimensional video image displayed on said liquid crystal display panel respectively in a first polarizing direction and in a second polarizing direction perpendicular to said first polarizing direction, said projection system comprising:
   a light source for generating a visible light;
   a reflector for reflecting said visible light in a given direction;
   a first lens for focusing the reflected light from said reflector;
   a first dichroic mirror for separating said visible light into red rays, green rays and blue rays;
   a filter for making the separated red rays, green rays and blue rays uniform;
   a first polarizing plate and a second polarizing plate each respectively arranged in an opposing relation at a respective opposing side of said liquid crystal display panel to make use of anisotropic light characteristics of said liquid crystal display panel;
   a second dichroic mirror for mixing the red rays, green rays and blue rays received from said filter through said first polarizing plate, said liquid crystal display panel and said second polarizing plate;
   a micro polarizer, said micro polarizer including a plurality of unit polarizing regions each corresponding to pixels of said liquid crystal display panel to polarize mixed light produced from said second dichroic mirror into said left eye image and said right eye image, adjacent ones of said unit polarizing regions being respectively polarized in two different polarizing directions, one of said adjacent ones of said unit polarizing regions being polarized in said first polarizing direction and another of said adjacent ones of said unit polarizing regions being polarized in said second polarizing direction; and
   a second lens for magnifying images from said micro polarizer; and
   at least one reflector for magnifying and reflecting an image projected including said right eye image and said left eye image from said projection system, with image light reflected from said at least one of reflector for projection.

5. A three dimensional image projection display system for displaying a three dimensional image on a screen, comprising:
   a three dimensional video signal processor for multiplexing video data of pixels of a left eye image and video data of pixels of a right eye image of a three dimensional image signal so as to alternately arrange said video data of the pixels of said left eye image and said video data of the pixels of said right eye image in a matrix form, said three dimensional video signal processor comprising:
   a signal separator for separating said three dimensional image signal into a synchronizing signal and a video signal;
   an analog to digital converter for converting said video signal, into a digital video signal;
   a first field memory and a second field memory for respectively storing left eye video data and right eye video data of an odd numbered frame of digital video data from said analog to digital converter;
   a third field memory and a fourth field memory for respectively storing left eye video data and right eye video data of an even numbered frame of digital video data from said analog to digital converter;
   a first multiplexer for multiplexing said left eye video data and said right eye video data of said first field memory and said second field memory so as to alternately arrange said left eye video data and said right eye video data of said first field memory and said second field memory in a matrix form;

a second multiplexer for multiplexing said left eye video data and said right eye video data of said third field memory and said fourth field memory so as to alternately arrange said left eye video data and said right eye video data of said third field memory and said fourth field memory in a matrix form;

a digital switch for alternately transferring an output of each of said first multiplexer and said second multiplexer; and a controller for performing an overall control function for said three dimensional image projection display system according to said synchronizing signal;

a liquid crystal display panel for displaying a multiplexed three dimensional video image from said three dimensional video signal processor; and a projection system for projecting said left eye image and said right eye image of said multiplexed three dimensional video image displayed on said liquid crystal display panel respectively in a first polarizing direction and in a second polarizing direction perpendicular to said first polarizing direction.

6. The three dimensional image projection display system of claim 5, further comprised of said three dimensional video signal processor further including a digital to analog converter for converting a digital video signal transferred by said digital switch into an analog video signal.

7. The three dimensional image projection display system of claim 5, further comprised of said first multiplexer alternately arranging said left eye video data and said right eye video data of said first field memory and said second field memory in a matrix to form at least one single frame, and said second multiplexer alternately arranging said left eye video data and said right eye video data of said third field memory and said fourth field memory in a matrix to form, at least one single frame.

8. The three dimensional image projection display system of claim 5, further comprised of said projection system comprising:

a light source for generating a visible light;

a reflector for reflecting said visible light in a given direction;

a first lens for focusing the reflected light from said reflector;

a first dichroic mirror for separating said visible light into red rays, green rays and blue rays;

a filter for making the separated red rays, green rays and blue rays uniform;

a first polarizing plate and a second polarizing plate each respectively arranged in an opposing relation at a respective opposing side of said liquid crystal display panel to make use of anisotropic light characteristics of said liquid crystal display panel;

a second dichroic mirror for mixing the red rays, green rays and blue rays received from said filter through said first polarizing plate, said liquid crystal display panel and said second polarizing plate;

a micro polarizer, said micro polarizer including a plurality of unit polarizing regions each corresponding to pixels of said liquid crystal display panel to polarize mixed light produced from said second dichroic mirror into said left eye image and said right eye image, adjacent ones of said unit polarizing regions being respectively polarized in two different polarizing directions, one of said adjacent ones of said unit polarizing regions being polarized in said first polarizing direction and another of said adjacent ones of said unit polarizing regions being polarized in said second polarizing direction; and a second lens for magnifying images from said micro polarizer.

9. The three dimensional image projection display system of claim 8, further comprised of said first multiplexer alternately arranging said left eye video data and said right eye video data of said first field memory and said second field memory in a matrix to form at least one single frame, and said second multiplexer alternately arranging said left eye video data and said right eye video data of said third field memory and said fourth field memory in a matrix to form at least one single frame.

10. The three dimensional image projection display system of claim 8, further comprised of said three dimensional video signal processor further including a digital to analog converter for converting a digital video signal transferred by said digital switch into an analog video signal.

11. The three dimensional image projection display system of claim 10, further comprised of said first multiplexer alternately arranging said left eye video data and said right eye video data of said first field memory and said second field memory in a matrix to form at least one single frame, and said second multiplexer alternately arranging said left eye video data and said right eye video data of said third field memory and said fourth field memory in a matrix to form at least one single frame.

12. A method for projecting a three dimensional image, comprising:

projecting a left eye image of a three dimensional image polarized in a first polarizing direction;

projecting a right eye image of said three dimensional image polarized in a second polarizing direction perpendicular to said first polarizing direction;

alternately arranging in a same line pixels of said left eye image with pixels of said right eye image in a matrix form; and magnifying and reflecting an image projected for said right eye image and for said left eye image using at least one reflector, with image light reflected from said at least one reflector for projection on a screen for displaying said three dimensional image.

13. The method as claimed in claim 12, further comprising the steps of:

multiplexing video data of the pixels of said left eye image and video data of the pixels of said right eye image of a three dimensional image signal to alternately arrange in a same line said video data of the pixels of said left eye image and said video data of the pixels of said right eye image in said matrix form;

providing a multiplexed three dimensional video image from said video data of the pixels of said left eye image and said video data of the pixels of said right eye image arranged in said matrix form; and projecting said left eye image and said right eye image of said multiplexed three dimensional video image respectively in the first polarizing direction and in the second polarizing direction.

14. A method for projecting a three dimensional image, comprising:

multiplexing video data of pixels of a left eye image and video data of pixels of a right eye image of a three dimensional image signal to alternately arrange said video data of the pixels of said left eye image and said video data of the pixels of said right eye image in a matrix form, said multiplexing video data comprising the steps of:

separating said three dimensional image signal into a synchronizing signal and a video signal;

converting said video signal into a digital video signal;

storing left eye video data and right eye video data of an odd numbered frame of digital video data from said digital video signal respectively in a first field memory and a second field memory;

storing left eye video data and right eye video data of an even numbered frame of digital video data from said digital video signal respectively in a third field memory and a fourth field memory;

multiplexing in a first multiplexer said left eye video data and said right eye video data of said first field memory and said second field memory so as to alternately arrange said left eye video data and said right eye video data of said first field memory and said second field memory in a matrix form;

multiplexing in a second multiplexer said left eye video data and said right eye video data of said third field memory and said fourth field memory so as to alternately arrange said left eye video data and said right eye video data of said third field memory and said fourth field memory in a matrix form; and alternately transferring an output of each of said first multiplexer and said second multiplexer to provide a multiplexed three dimensional video image; and projecting said left eye image and said right eye image of said multiplexed three dimensional video image respectively in a first polarizing direction and in a second polarizing direction perpendicular to said first polarizing direction for projection on a screen.

15. The method as claimed in claim 14, further comprised of said step of projecting said left eye image and said right eye image of said multiplexed three dimensional video image comprising the steps of:

generating from a light source a visible light;

reflecting said visible light in a given direction;

focusing the reflected light onto a first dichroic mirror to separate said visible light into red rays, green rays, and blue rays;

filtering to make the separated red rays, green rays and blue rays uniform;

mixing the red rays, green rays and blue rays after said filtering by use of a second dichroic mirror; and polarizing mixed light produced from said second dichroic mirror into said left eye image and said right eye image.

16. A method for projecting a three dimensional image, comprising:

multiplexing video data of pixels of a left eye image and video data of pixels of a right eye image of a three dimensional image signal to alternately arrange said video data of the pixels of said left eye image and said video data of the pixels of said right eye image in a matrix form;

providing a multiplexed three dimensional video image from said video data of the pixels of said left eye image and said video data of the pixels of said right eye image arranged in said matrix form; and projecting said left eye image and said right eye image of said multiplexed three dimensional video image respectively in a first polarizing direction and in a second polarizing direction perpendicular to said first polarizing direction, projecting said left eye image and said right eye image of said multiplexed three dimensional video image comprising the steps of:

generating from a light source a visible light;

reflecting said visible light in a given direction;

focusing the reflected light onto a first dichroic mirror to separate said visible light into red rays, green rays, and blue rays;

filtering to make the separated red rays, green rays and blue rays uniform;

mixing the red rays, green rays and blue rays after said filtering by use of a second dichroic mirror; and polarizing mixed light produced from said -second dichroic mirror into said left eye image and said right eye image.

* * * * *